3,228,827
NEMATODE CONTROL EMPLOYING
ALKANESULFONIC ACIDS
John E. Larson, Davis, and Jerome G. Kuderna, Jr., Modesto, Calif., assignors to Shell Oil Company, New York, N.Y., a corporation of Delaware
No Drawing. Filed May 3, 1963, Ser. No. 277,728
5 Claims. (Cl. 167—30)

This application is a continuation-in-part of our application Serial No. 156,485, filed December 1, 1961 now abandoned.

This invention relates to the control of soil-dwelling nematodes.

It has been found that the 2,4-dihalophenyl esters of lower alkanesulfonic acids, and of lower haloalkanesulfonic acids are excellent nematocides, having high initial nematocidal activity which is maintained for long periods of time. Further, these sulfonates have been found to be essentially non-phytotoxic to living plants, including seeds thereof, at the nematocidally effective dosages, so that these sulfonates can be used to control nematodes in soil in which plants are growing, or can be used to destroy nematodes in soil and plants immediately, or soon, thereafter planted in the soil without risk of damage to the plants by the nematocide.

These nematocides are the 2,4-dihalophenyl esters of lower alkanesulfonic acids, and of lower haloalkanesulfonic acids and are represented by the formula:

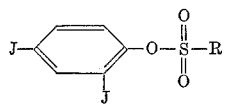

wherein J represents halogen and R represents a lower alkyl or haloalkyl group, for example, an alkyl or haloalkyl group containing up to ten carbon atoms. In these compounds, R suitably may be straight-chain in configuration, or it may be branched-chain in configuration. The haloalkyl group represented by R suitably can be monohalogenated or polyhalogenated. Preferred are the haloalkyl groups wherein each halogen is middle halogen—that is, chlorine or bromine. The position(s) of the halogen atom(s) on the alkyl structure does not appear to be critical to the intended use. The esters of methanesulfonic acid and halomethanesulfonic acids, particularly of chloromethanesulfonic acid, appear to be most effective, and therefore are preferred. Typical members of this class of nematocides thus include 2,4-dichlorophenyl methanesulfonate, 2,4-dibromophenyl methanesulfonate, 2,4 - dichlorophenyl ethanesulfonate, 2,4 - dichlorophenyl 1 - propanesulfonate, 2,4 - dichlorophenyl 2 - propanesulfonate, 2,4 - dichlorophenyl 1 - butanesulfonate, 2,4 - dibromophenyl ethanesulfonate, 2,4-dichlorophenyl 1-pentanesulfonate, 2,4-dibromophenyl 1-hexanesulfonate, 2-chloro - 4 - fluorophenyl methanesulfonate, 2 - fluoro - 4 - chlorophenyl methanesulfonate, 2,4-difluorophenyl methanesulfonate, 2-bromo-4-iodophenyl methanesulfonate, 2,4 - diiodophenyl methanesulfonate, 2 - chloro - 4 - bromophenyl methanesulfonate, 2-bromo-4-chlorophenyl methanesulfonate, 2,4-dichlorophenyl chloromethanesulfonate, 2,4-dichlorophenyl bromomethanesulfonate, 2,4-dibromophenyl chloromethanesulfonate, 2,4-dichlorophenyl 2-chloroethanesulfonate, 2,4 - dichlorophenyl 1 - chloroethanesulfonate, 2,4-dichlorophenyl 1,3-dichloro-2-propanesulfonate, 2,4-dichlorophenyl trichloromethanesulfonate, 2,4 - dichlorophenyl dichloromethanesulfonate, 2,4 - dichlorophenyl 2,2 - dichloroethanesulfonate, 2,4 - dichlorophenyl 1,2 - dichloroethanesulfonate, 2,4 - dichlorophenyl 2,3-dichloro-1-propanesulfonate, and the like. Compounds of this class which appear to have most promise as nematocides are the 2,4-di(middle halo)phenyl alkanesulfonates (J represents middle halogen—that is, bromine or chlorine) wherein the alkyl group contains from 1 to 4 carbon atoms and the corresponding (middle halo) methanesulfonates, and of these the alkanesulfonates wherein the halogens, J, are both chlorine appear to have the highest nematocidal activity, while in the case of the (middle halo)methanesulfonates, the chloromethanesulfonates wherein both of the halogens, J, are chlorine, appear to have the highest nematocidal activity.

These compounds are readily prepared by the reaction of the appropriate 2,4-dihalophenol with the appropriate alkane- or haloalkanesulfonyl chloride in the presence of an acid acceptor such as pyridine. The preparation of these compounds is illustrated by the following example showing preparation of 2,4-dichlorophenyl methanesulfonate from 2,4 - dichlorophenol and methanesulfonyl chloride in the presence of pyridine.

EXAMPLE I 664 grams of 2,4-dichlorophenol was dissolved in 500 milliliters of benzene and 324 grams of pyridine. The mixture was cooled to 35° C. and 471 grams of methanesulfonyl chloride was gradually added, the mixture being cooled so that the temperature rose slowly and reached in one hour 70° C. at the end of the addition of the sulfonyl chloride. The final mixture was then heated at 90° C. for an additional two hours, then poured into 500 milliliters of benzene to precipitate pyridine hydrochloride. A kilogram of ice containing 100 milliliters of concentrated hydrochloric acid was added and the mixture stirred until the ice had melted. The aqueous and benzene layers were decanted from a mass of white crystals that had formed. The crystals were recrystallized from methanol to give 344 grams of 2,4-dichlorophenyl methanesulfonate, melting at 61–63° C. The benzene phase was separated from the water and dried, the benzene was stripped off under vacuum, and the residue was distilled at 2 Torr. to give a fraction boiling at 120–140° C. This was seeded with a crystal of 2,4-dichlorophenyl methanesulfonate already obtained to give an additional 436 grams of 2,4-dichlorophenyl methanesulfonate. The identity of the product was established by elemental analysis.

Other 2,4-dihalophenyl (lower alkane)sulfonates are prepared in a similar manner—that is, by mixing the appropriate 2,4-dihalophenol with a suitable solvent, such as benzene, a slight—5–15%—molar excess of a hydrogen halide acceptor such as pyridine, then adding slowly a slight—5–15%—molar excess of the appropriate (lower alkane)sulfonyl chloride, maintaining the reaction mixture initially at a temperature of about 20–40° C., then gradually increasing the temperature to about 70–100° C. to insure completion of the reaction. Recovery of the product ordinarily is accomplished in the manner shown in the example—that is, by use of a selective solvent to separate the desired product from the hydrogen halide salt of the acceptor, washing the solution of the product with an aqueous acid wash, and recovering the desired sulfonate product by extraction, distillation and/or crystallization techniques.

The 2,4-dihalophenyl (lower alkane)sulfonates and their lower (haloalkane) counterparts have been found to be effective killers of soil-dwelling nematodes—that is, the unsegmented roundworms of the class Nematoda, also known as eelworms, which customarily inhabit soil and feed upon the roots of plants growing therein. Included are the cyst forming nemotodes of the genus Heterodera, the stubby root nematodes of the genus Trichodorous, the bulb and stem nematodes of the genus Ditylenchus, the golden nematode (*Heterodera rostochiensis*), the root knot nematodes of the genus Meloidogyne, the root-lesion nematodes of the genus Pratylenchus, the citrus nematodes of the genus Tylenchulus, the sting nematodes of the genus Belonolaimus, and the plant-parasitic nematodes of such genera as Naccobus, Radopholus, and the like.

These sulfonates are employed for the destruction of nematodes in soil by disseminating the sulfonates in the nematode-infested soil, to provide the necessary concentration of the sulfonates in the soil. Judging by the experimental work which has been performed, the nematocidally effective concentrations of these sulfonates in the soil lie within the range of from about 1 to about 50 parts per million, on a weight basis based on the weight of the air-dry soil, with the usual dosage ranging from about 4 to about 20 parts per million, on the same basis. As a practical matter, the effective dosage generally amounts to from about 2 to about 100 pounds of the nematocide per acre of land, depending upon the depth of soil to be treated, which may be up to 6, or 8, or even 12 inches, depending upon the particular species of plants and nematodes involved. Generally, dosages of from about 8 to about 40 pounds of the nematocide per acre of land are preferred.

The 2,4-dihalophenyl (lower alkane)- and (lower haloalkane)sulfonates are in general solids at ordinary room temperatures. They may be applied to the soil neat—as by grinding the solid sulfonates, then admixing the resulting dust or powder with the soil to be treated. Alternatively, the sulfonates may be dissolved in a suitable liquid diluent and the solution applied to and mixed with the soil, or the sulfonates may be formulated with a suitable solid carried and applied as a dust, powder or as granules to the soil and admixed therewith. These sulfonates are not very soluble in water, so that water is not a suitable solvent. By use of suitable emulsifying and dispersing agents, however, the sulfonates can be emulsified or dispersed in water and the emulsion applied to the soil to be treated to provide effective control of the nematodes therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulisfying or dispersing agent will be from about 0.5 to about 5 percent of the weight of the formulation. Alternatively, or in addition, in some cases it may be to advantage to dissolve the sulfonate or sulfonates to be used in a solvent which can readily be dispersed in water to produce a heterogeneous dispersion of the nematocide in the water.

Where the sulfonate nematocide is to be applied as a solution, suitable solvents include water-immiscible alcohols, ketones and hydrocarbons, such as, for example, isopropyl alcohol, benzene, acetone, methyl ethyl ketone, secondary butyl alcohol, kerosene, chlorinated hydrocarbons, various non-phytotoxic hydrocarbon fractions which are ordinarily used in disseminating agricultural chemicals, including spray oils, horticultural oils, and the like.

The suitable solid carriers ordinarily are those which are essentially inert in the soil and which are not hygroscopic—for if they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable inert carriers are those well known to the art including the clays such as the kaolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phospates, precipitated calcium carbonate and colloidal silica. These diluents may represent a substantial portion; for example, 50 to 98 percent by weight of the entire formulation.

These solid formulations can be prepared by grinding or airmilling the carrier and nematocide together. Alternatively, the solid formulations can be formed by dissolving the nematocide in a suitable solvent, such as a volatile solvent, impregnating and/or coating the particles with the solution and if necessary, removing the solvent. The formulation also can be effected by melting the nematocide and mixing the molten nematocide with the carrier. Granular formulations can be prepared by impregnating and/or coating granules of the carrier with the nematocide or by forming granules of mixtures of the nematocide and carrier.

From the standpoint of mechanics, the nematocide, neat or as a formulation, is applied to the soil in any manner which enables its intimate admixture with the soil to be treated. Thus the nematocide, which includes formulations thereof, can be applied to the surface of the soil, or it can be applied below the surface of the soil, and then admixed with the soil. If in the form of a liquid formulation, the nematocide can be drenched onto the surface of the soil or injected into the soil. In other words, conventional means, well known in the art, can be used to effect intimate admixture of the nematocide with the soil to be treated.

The 2,4-dihalophenyl (lower alkane)sulfonates and their lower (haloalkane) counterparts are characterized by a very extended effective life in the soil and essentially to phytotoxicity at the nematocidally effective dosages. Consequently, it may not in all cases be necessary to treat the entire mass of nematode-infested soil —in some cases it may be sufficient to treat only the soil of the rhizosphere of the plants to be protected. Thus, the soil immediately surrounding the roots of established trees can be treated to protect the trees, and row crops can be protected by treating only the soil which will surround the roots of the plants in each before the seeds or plants are planted, or after the plants have been planted. The formulations of the nematocides can also contain other materials, such as insecticides, fungicides, nematocides of different action and/or different physical characteristics, hormones, and/or fertilizers, to form multipurpose compositions.

The effectiveness of the 2,4-dihalophenyl (lower alkane)-20 and (lower haloalkane)sulfonates as nematocides has been demonstrated by the following tests performed on typical species of these esters:

EXAMPLE II

The test compounds:

I—2,4-dichlorophenyl methanesulfonate
II—2,4-dichlorophenyl ethanesulfonate
III—2,4-dichlorophenyl butanesulfonate
IV—2,4-dichlorophenyl chloromethanesulfonate
V—2,4-dibromophenyl methanesulfonate
VI—2,4-dibromophenyl ethanesulfonate The test procedure: two-quart samples of soil infested with the root-knot nematode, *Meloidogyne incognita* (var. *acrita*) were used. All tests were made in duplicate sets. In one set, two 2-quart samples were used as blanks. Another two set, 2-quart samples were thoroughly mixed with a powdered, inert carrier material which had been impregnated with the test compound, the amount of the impregnated carrier being sufficient to provide the desired dosage of test compound in the two quarts of soil. The samples of soil then were held at 80° F. for two weeks, then were transferred to 4-inch pots and the soil seeded with tomatoes. After six weeks, the soil was washed from the roots of the plants and the amount of damage caused by the nematodes was visually ascertained by experienced observers. The dosages used and the control of nematodes obtained at each dosage of each of the test compounds is set out in Table I.

*Table I*

| Test Compound | Dosage (grams per two-quart sample of soil) | Percent Control of Nematodes |
|---|---|---|
| I | 0.004 | 100 |
|   | 0.002 | 96 |
|   | 0.001 | 96 |
| II | 0.008 | 97 |
| III | 0.008 | 72 |
| IV | 0.002 | 100 |
|   | 0.001 | 89 |
| V | 0.01 | 100 |
|   | 0.002 | 96 |
| VI | 0.01 | 100 |
|   | 0.002 | 89 |

In none of these tests was there observed any damage to the plants attributable to the presence of the nematocide.

EXAMPLE III

To test the life of these nematocides, certain of them were further tested as above, except that the soil samples were held for four weeks before being transferred to the pots and planted to tomatoes. The results are set out in Table II.

*Table II*

| Test Compound | Dosage (grams per two-quart sample of soil) | Percent Control of Nematodes |
|---|---|---|
| I | 0.002 | 100 |
|   | 0.001 | 95 |
| III | 0.008 | 70 |
|   | 0.002 | 100 |
| IV | 0.002 | 100 |
|   | 0.001 | 95 |
| V | 0.01 | 100 |
|   | 0.002 | 96 |
| VI | 0.01 | 100 |
|   | 0.002 | 75 |
|   | 0.001 | 80 |

Again, no damage to the plants attributable to the nematocide was noted.

EXAMPLE IV

The lives of Compounds I and III as nematocides were tested under somewhat different conditions. In these tests, nematode-free soil was mixed with the carrier impregnated with the test compound, and these mixtures held at 80° F. for periods of time varying from 1 to 4 weeks, then transferred into 4-inch pots. The soil in each of the pots then was inoculated with 200–300 viable second-stage rootknot nematode larvae, and tomato seeds planted in each pot. The determination of nematode control was made as set out in Example II. The results are set out in Table III.

*Table III*

| Test Compound | Holding Period (weeks) | Dosage (grams per two-quart sample of soil) | Percent Control of Nematodes |
|---|---|---|---|
| I | 1 | 0.012 | 82 |
|   |   | 0.004 | 47 |
|   | 2 | 0.012 | 88 |
|   |   | 0.004 | 72 |
|   | 4 | 0.012 | 100 |
|   |   | 0.004 | 77 |
| III | 4 | 0.012 | 89 |
|   |   | 0.004 | 43 |

EXAMPLE V

Experiments conducted in the field confirmed the laboratory experiments.

A. An emulsifiable concentrate containing 0.24 part by weight of 2,4-dichlorophenyl methanesulfonate per part by volume of the concentrate was emulsified with water and drenched onto the test plots to provide the equivalent of 4 inches of the water mixture over the surface of the plots, and to provide dosages of 25, 50 and 75 pounds per acre of the sulfonate. A check plot received only the 4 inches of water. Three replicates were made. Pretreatment sampling of the soil to a depth of 24 inches indicated a high population of root-knot nematodes (*Meloidogyne incognita* sp.). The soil was generally very sandy to a depth of about 15 inches, then either clay or sandy loam. After three weeks, the plots were sampled to a depth of 18 inches, the samples potted and planted to tomatoes. The tomatoes were harvested after six weeks and the amount of damage caused by nematodes was visually ascertained by experienced observers.

It was found that in all of the test plots, there was no nematodes infection in the soil to the depth sampled. In the check plot, a high population of nematodes was found over the 18-inch depth sampled.

B. The experiments described above were repeated, except that the 2,4-dichlorophenyl methanesulfonate was formulated as granules containing 2% by weight of the sulfonate, the granules were raked lightly into the soil, and then the soil was drenched with the water.

Again, it was found that in all of the test plots, there was no nematode infection in the soil to the depth sampled, while in the check plot, a high population of nematodes was found over the 18-inch depth sampled.

C. The experiments described above were repeated, except that the 2,4-dichlorophenyl methanesulfonate was applied to the surface of the soil (as the 2% granules or as a solution of 0.1 part by weight in 1 part by volume of xylene), then the soil was rototilled. The dosage in these tests was 25 pounds of the sulfonate per acre. The distribution of the sulfonate in the soil, as to depth, was apparently not uniform, for the depth of the soil freed of nematodes varied from 12 inches to 18 inches.

The results of these tests confirm, the effectiveness of the 2,4-dihalophenyl (lower alkane) sulfonates and their (lower haloalkane) counterparts as nematocides for soil-dwelling nematodes.

We claim as our invention:

1. A method for combatting soil-borne nematodes which comprises introducing into nematode-infested soil an effective dosage of at least one 2,4-dihalophenyl ester of lower alkanesulfonic acid.

2. A method for combatting soil-borne nematodes which comprises introducing into nematode-infested soil an effective dosage of at least one 2,4-dihalophenyl ester of lower haloalhanesulfonic acid.

3. A method for combatting soil-borne nematodes which comprises introducing into nematode-infested soil an effective dosage of at least one compound of the formula:

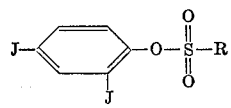

wherein J represents a middle halogen atom of the group selected from bromine and chlorine and R is a member of the group consisting of lower alkyl and lower haloalkyl where the halogen is middle halogen of the group consisting of chlorine and bromine.

4. A method for combatting soil-borne nematodes which comprises introducing into nematode-infested soil an effective dosage of 2,4-dichlorophenyl methanesulfonate.

5. A method for combatting soil-borne nematodes which comprises introducing into nematode-infested soil an effective dosage of 2,4-dichlorophenyl chloromethanesulfonate.

References Cited by the Examiner
UNITED STATES PATENTS

| | | | |
|---|---|---|---|
| 2,567,008 | 9/1951 | Britton | 260—456 |
| 2,911,439 | 11/1959 | Makle | 260—543 |
| 3,010,871 | 11/1961 | Gilbert | 167—30 |
| 3,034,952 | 5/1962 | Beames | 167—30 |

JULIAN S. LEVITT, *Primary Examiner.*